(12) United States Patent
Khani et al.

(10) Patent No.: US 12,058,302 B2
(45) Date of Patent: Aug. 6, 2024

(54) ENCODING DEPTH INFORMATION FOR IMAGES

(71) Applicant: Samsung Electronics Co., Ltd., Suwon-si (KR)

(72) Inventors: Aamer Khani, Dublin, CA (US); Papiya Nath, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 17/897,555

(22) Filed: Aug. 29, 2022

(65) Prior Publication Data

US 2023/0328216 A1    Oct. 12, 2023

Related U.S. Application Data

(60) Provisional application No. 63/328,158, filed on Apr. 6, 2022.

(51) Int. Cl.
*H04N 13/161* (2018.01)
*H04N 13/106* (2018.01)
(Continued)

(52) U.S. Cl.
CPC ......... *H04N 13/161* (2018.05); *H04N 13/106* (2018.05); *H04N 13/122* (2018.05); *H04N 13/128* (2018.05); *H04N 13/194* (2018.05); *H04N 19/12* (2014.11); *H04N 19/597* (2014.11); *H04N 13/275* (2018.05)

(58) Field of Classification Search
CPC ...... H04N 13/00; H04N 13/10; H04N 13/106; H04N 13/122; H04N 13/128; H04N 13/194; H04N 2013/0081; H04N 13/275
See application file for complete search history.

(56) References Cited

U.S. PATENT DOCUMENTS 7,525,542 B2    4/2009  Stevenson
10,095,953 B2  10/2018  Smolic
(Continued)

FOREIGN PATENT DOCUMENTS

| CN | 107909150 A | * | 4/2018 | ........... G06N 3/0454 |
| KR | 20200111089 A | * | 9/2020 | ........... H04N 13/194 |
| KR | 10-2021-0041057 A | | 4/2021 | |

OTHER PUBLICATIONS

A. Laikari, P. Fechteler, B. Prestele, P. Eisert, & J.P. Laulajainen, "Accelerated Video Streaming for Gaming Architecture", presented at the 2010 IEEE 3DTV Conference, Jun. 2010 (Year: 2010).*

(Continued)

*Primary Examiner* — David N Werner (57) ABSTRACT

In one embodiment, a method includes accessing depth information for three-dimensional content for one or more images, the depth information having been encoded based on a first near-plane value and a first far-plane value. The method further includes accessing an adjusted near-plane value and an adjusted far-plane value, where the adjusted near-plane value and the adjusted far-plane value are based on a loss function with respect to the depth information; and encoding the depth information for transmission using the adjusted near-plane value and the adjusted far-plane value.

20 Claims, 3 Drawing Sheets

(51) Int. Cl.
  *H04N 13/122* (2018.01)
  *H04N 13/128* (2018.01)
  *H04N 13/194* (2018.01)
  *H04N 19/12* (2014.01)
  *H04N 19/597* (2014.01)
  *H04N 13/275* (2018.01)

(56) References Cited

U.S. PATENT DOCUMENTS

| | | |
|---|---|---|
| 10,298,905 B2 | 5/2019 | Varekamp |
| 2009/0160934 A1 | 6/2009 | Hendrickson |
| 2011/0109629 A1* | 5/2011 | Lauer .................. A21B 1/48 99/443 C |
| 2013/0229408 A1* | 9/2013 | Sull .................. H04N 13/128 345/419 |
| 2015/0071362 A1 | 3/2015 | Uchiumi |
| 2018/0113311 A1* | 4/2018 | Klug .................. H04N 13/344 |
| 2020/0112712 A1* | 4/2020 | Koblin .................. H04N 21/4884 |
| 2020/0137380 A1 | 4/2020 | Supikov |
| 2020/0349729 A1* | 11/2020 | Wu .................. H04N 13/122 |
| 2021/0264661 A1 | 8/2021 | Voss-Wolff |
| 2021/0266575 A1 | 8/2021 | Litwic |
| 2021/0281813 A1* | 9/2021 | Vyas .................. G06T 3/4053 |
| 2021/0314550 A1 | 10/2021 | Godard |
| 2022/0222842 A1* | 7/2022 | Mccombe .................. H04N 13/373 |
| 2022/0385880 A1* | 12/2022 | Nims .................. H04N 13/239 |

OTHER PUBLICATIONS

KR 2020-0111089 A (Year: 2020).*
Flynn et al., "Deep View: View Synthesis with Learned Gradient Descent", 2019 IEEE/CVF Conference on Computer Vision and Pattern Recognition, Jun. 2019.

* cited by examiner

ENCODING DEPTH INFORMATION FOR IMAGES

PRIORITY CLAIM

This application claims the benefit under 35 U.S.C. 119 of U.S. Provisional Patent Application No. 63/328,158 filed Apr. 6, 2022, the entirety of which is incorporated herein by reference.

TECHNICAL FIELD

This application generally relates to encoding depth information for images.

BACKGROUND

Three-dimensional (3D) image content, such as three-dimensional content for video, can be rendered by a graphics processing unit (GPU) executing on a computing device, such as a smartphone, a personal computer, a server computing device, a tablet, or any other suitable computing device. During rendering, the GPU often produces a pair of visual (e.g., red-green-blue or "RGB" color buffers) and depth buffers representing information about the three-dimensional image content.

A device with a GPU may transfer rendering information, such as RGB and depth buffers, to second device. For example, the second device may have fewer computational resources relative to the first device, and so the first device (such as a GPU in the first device) may perform 3D rendering and then transmit the rendering information to second device for displaying the 3D content to a user. For example, the first device may be a smartphone, personal computer, or server device and the second device may be a head-worn device, such as augmented reality (AR) or virtual reality (VR) glasses. A compression algorithm, such as the H.264 or H.265 video compression algorithms, are often used to transmit RGB and depth buffer information from a first device to a second device.

DESCRIPTION OF EXAMPLE EMBODIMENTS

An application running on a first device, such as a gaming application or an AR/VR application, can create 3D content, such as 3D video, for example by specifying object geometry and materials for objects in the 3D scene. The 3D content may be controlled by a graphics engine, such as the Unreal engine or the Unity engine, and 3D content may be rendered by a GPU or CPU (or both) on the first device. If the first device transmits 3D information to a second device then the transmission will use a compression algorithm, typically the H.264 or H.265 video compression algorithm. However, as explained more fully herein, these compression algorithms degrade the depth information that is transmitted to the second device, such that when the 3D content is displayed on the second device using the transmitted depth information, the 3D content appears misplaced, distorted, or having other artifacts that degrade the displayed images.

Figure 1:
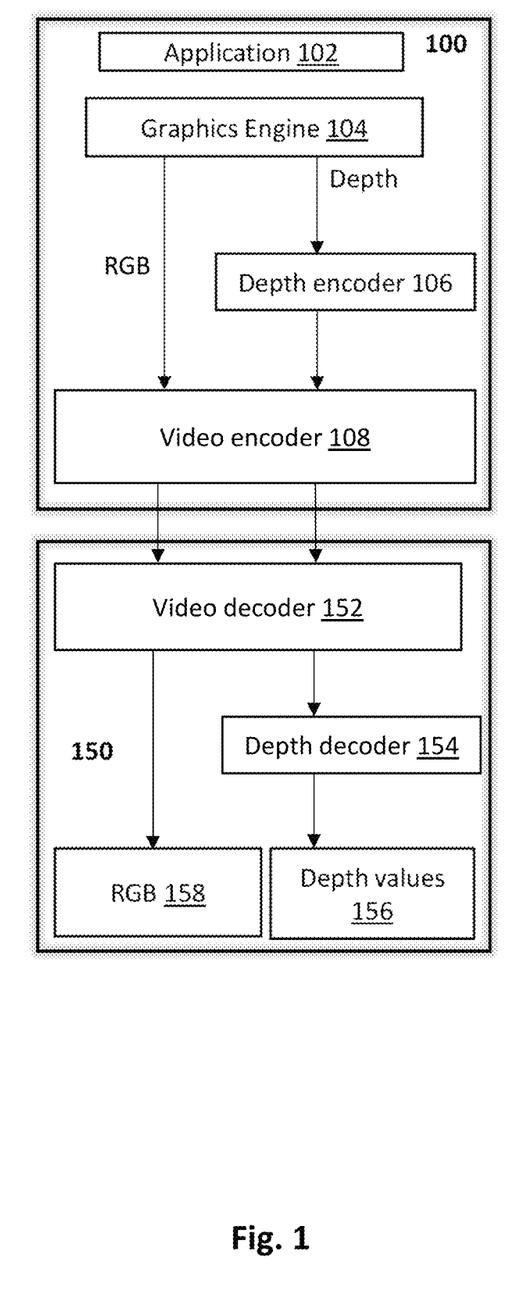
FIG. 1 illustrates an example approach that improves transmission of depth information from a first device to a second device.

FIG. 1 illustrates an example approach that improves transmission of depth information from a first device to a second device. As shown in FIG. 1, a first device 100 includes application 102 that generates some 3D content for rendering, for example by specifying object geometry and/or object materials. First device 100 may include graphics engine 104, such as the Unreal engine or Unity engine, for rendering 3D content. In particular embodiments, some or all of the rendering may be performed by a GPU integrated with device 100.

As shown in the example of FIG. 1, 3D content may be created or specified by an application running on a first device, such as device 100, and 3D content may be transmitted to a second device, such as second device 150. For example, second device 150 may include a display screen for displaying 3D content to a user. For example, second device 150 may be a head-worn device, such as AR or VR glasses, that can display 3D content to a user. First device 100 may be any suitable computing device, such as for example a computing device local to device 150, such as a smartphone, personal computer, tablet, etc., or may be a computing device remote from device 150, such as for example a server computing device. Moreover, while the example of FIG. 1 illustrates one computing device 100 generating and transmitting 3D content to one second device 150, this disclosure contemplates that other computing devices may be involved in the generation, processing, distribution, or display of 3D content as described herein. For example, the operations of device 100 may be performed by one or more computing devices, such as one or more server devices, one or more local client devices, or a combination thereof. As another example, one computing device may host an application that creates 3D content, and that computing device may pass the 3D content to another computing device that, for example, hosts a graphics engine for rendering the 3D content, and that second computing device may encode and transmit the encoded 3D content to a third computing device, which may display the 3D content to a user.

As illustrated in FIG. 1, graphics engine 104 creates a color (e.g., RGB) buffer and a depth buffer for 3D content in the scene. To transmit this information to second device 150, first device 100 includes video encoder 108, which for example may use H.264 or H.265 video compression to compress the 3D content for transmission to second device 150.

Video codecs, such as those used by video encoder 108, are bandwidth-limited and therefore compress the video information for transmission. Video codecs are typically specifically optimized and tuned for color information, particularly for color as perceived by a human. For example, video codecs often allocate fewer bits to color information than to luminance information. However, depth information has different characteristics when compared to color information. For example, depth information in an image usually consists of more homogeneous regions with abrupt discontinuities at the borders of objects in the scene. In particular embodiments, depth content may include regions of invalid pixels scattered throughout an image of a scene. Therefore, using video compression algorithms such as H.264 and H.265 (which have been optimized for color information) for compression and transmission of depth information leads to sub-optimal compression performance, for example resulting in artifacts and geometric distortions after the 3D content is decoded and displayed to a user. For example, due to compression losses depth at the edges of objects in a 3D scene often are not preserved, creating artifacts.

The H.264 video codec uses three 8-bit channels to compress data, while other algorithms can use more data per channel, such as for example H.265 which allocates 10 bits per channel. As illustrated in FIG. 1, the RGB visual buffer information is transmitted to video encoder 108, which encodes the RGB information and transmits it to second device 150 for decoding, e.g., by video decoder 152 on second device 150. For example, the H.264 codec performs a color-space transformation (i.e., converts the RGB channels to three 8-bit YUV channels) before starting the frame encoding, with higher precision in the Y channel. Compared to the Y channel, information in U and V channels are subject to a lot of compression errors and losses. However, as these algorithms have been optimized for visual information, compression of color and luminance information according to these codecs results in good quality color content after the compressed information is decompressed and displayed to the user.

In contrast, depth information may be represented by, for example, 16 bits or 24 bits as output by graphics engine 104. If this depth information is compressed for transmission, e.g., according to the H.264 codec, then the depth information must be compressed into the YUV channels. However, as explained above, the U and V channels have lots of compression and distortion relative to the Y channel, and so H.264 compression requires restricting compression and transmission of 16-bit or 24-bit depth information to the 8-bit Y channel, resulting in significant loss of depth information, or requires using the U and V channels, resulting in significant artifacts after decompression. For example, depth information across a spectrum of distances (e.g., what appears to be 0.3 meters to 10 meters in front of the user after the scene is displayed to the user) may be mapped to a much smaller number of discrete distances after compression, forcing objects to artificially appear at a set of limited distances from the user. For example, if 16-bit depth is mapped to the 8-bit Y channel according to the H.264 algorithm, then in particular embodiments everything between what corresponds to 2 meters and 10 meters may be rounded to either 2 meters or 10 meters, creating significant distortion and limitations in the appearance of 3D depth information to the user.

As shown in FIG. 1, this disclosure provides a depth encoder 106 and depth decoder 154 that both uses existing compressing algorithms such as H.264 and H.265 and significantly improves the fidelity of depth information and therefore the display of 3D content to the user. Moreover, depth encoder 106 and decoder 154 avoid the computational expense of other approaches for encoding depth, for example approaches that use custom (e.g. non H.264 or H.265) lossless compression algorithms that are both complex and computationally expensive, because depth encoder 106 and decoder 154 are able to obtain high-quality depth information using only one channel (e.g., one 8-bit H.264 channel) in the H.264/265 compression algorithms. In addition, depth encoder 106 and decoder 154 eliminate the need for computational post-processing that is required if depth information is encoded into the three channels of H.264 and H.265 in order to correct the errors introduced by using those lossy channels, for example errors in depth discontinuity that require additional processing.

Figure 2:
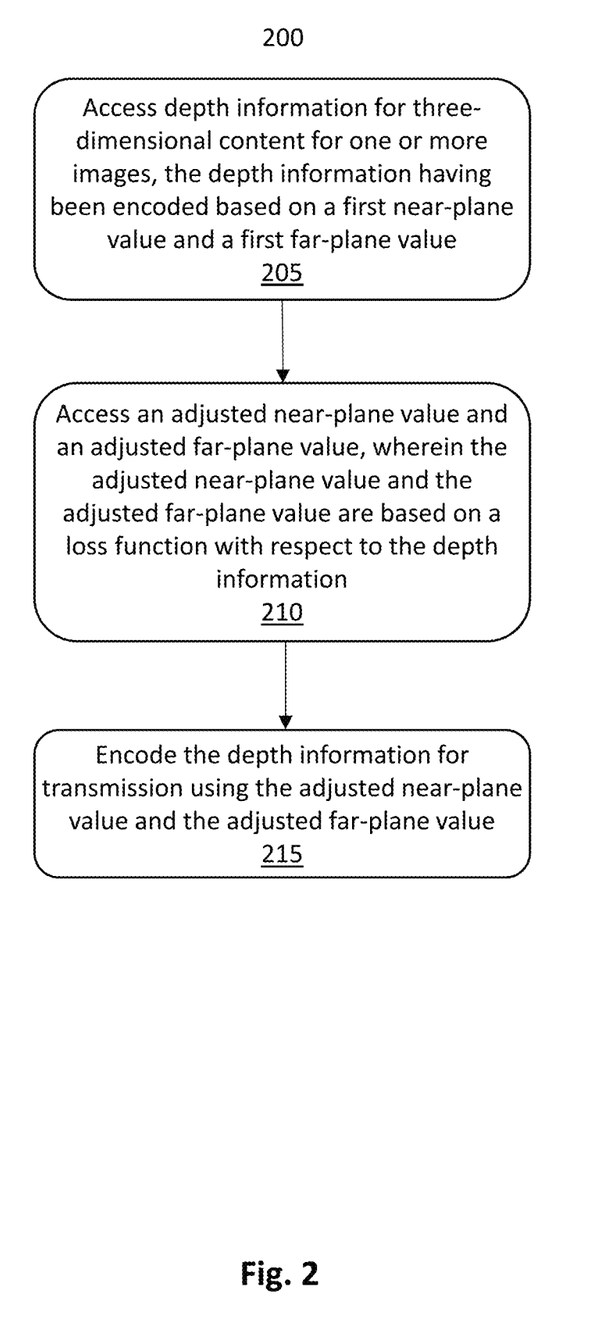
FIG. 2 illustrates an example depth encoder.

FIG. 2 illustrates an example of a depth encoder 200, which may be depth encoder 106 illustrated in FIG. 1. At step 205, the depth encoder may access depth information for three-dimensional content for one or more images, where the depth information is encoded based on a first near-plane value and a first far-plane value. As explained above, the images may be images with 3D content generated by an application, such as for example application 102 of FIG. 1. In particular embodiments, a graphics engine such as engine 104 may encode depth information (for example using 16-bits or 24-bits, as described above) for each pixel in an image, and the encoding may be made with respect to a near plane and a far plane, each of which are specified by the application that created the 3D content, for example by a virtual camera of the application creating the 3D content. For example, the near and far planes may specify the distances at which 3D content will be rendered from the viewer's perspective (i.e., the content between the near and far plane), while content outside the near and far planes will be clipped. The depth encoding performed by a graphics engine, such as engine 104, is non-linear in that the depth information doesn't linearly map to distances in the rendered 3D content. This disclosure contemplates that step 205 may include retrieving a first pair of near and far plane values, and/or may include receiving those values as sent by, e.g., a graphics engine to depth encoder 200.

At step 210, depth encoder 200 may access an adjusted near-plane value and an adjusted far-plane value, where the adjusted near-plane value and the adjusted far-plane value are based on a loss function with respect to the depth information output by, e.g., the graphics engine using application-provided near-plane and far-plane values. For example, a gradient descent approach may be used to learn the adjusted near and far plane values, for example by minimizing the loss in depth information that occurs when compressing 16 or 24 bit depth values to 8-bit depth values. For example, a learning rate of a (for example, 0.001) may be used. For each epoch, the following gradient descent approach may be used, until the total number of specified epochs has occurred:

$$\text{Loss} = J(NearB, FarB) \quad (1)$$

$$NearB = NearB - \alpha \frac{\partial}{\partial NearB} \quad (2)$$

$$FarB = FarB - \alpha \frac{\partial}{\partial FarB}, \quad (3)$$

where "NearB" is the adjusted near-plane value and "FarB" is the adjusted far-plane value. The loss function J is based on the mean square error as follows:

$$J = \frac{1}{S*W*H} \sum_{N=1}^{S} \sum_{N=1}^{W} \sum_{N=1}^{H} \quad (4)$$

$$(toLinearEyeSpace(D) - toLinearEyeSpace(toLossy8Bits(D_{RE})))^2$$

where S represents the total number of images being used by the model for learning purpose, W represents the width of each image, H represents the height of each image, D represents the application-provided non-linear depth values, and $DR_E$ represents the re-encoded non-linear depth values resulting from equation no. 9, which is a function of the nearB and farB adjusted plane values. "toLinearEyeSpace" is the function provided in equation no. 7, and "toLossy8Bits" is a function that converts depth image buffers to 8-bit unsigned integers, for example using the output of a function "return double(im2uint8(Depth))/255," where "im2uint8" is a known MATLAB function that converts images to 8-bit unsigned integers.

In particular embodiments, a numerical approximation of the partial derivatives with respect to NearB and FarB shown above may be used, for example according to the following equations:

$$\frac{\partial J}{\partial NearB} = \frac{(J(NearB + \text{delta}, FarB) - J(NearB - \text{delta}, FarB))}{2 * \text{delta}} \quad (5)$$

$$\frac{\partial J}{\partial FarB} = \frac{(J(NearB, FarB + \text{delta}) \cdot J(NearB, FarB - \text{delta}))}{2 * \text{delta}} \quad (6)$$

where "delta" is a suitably small number, such as, for example, delta=$1*10^{-9}$. The total number of epochs on which to train the example gradient-descent model for learning the values of NearB and FarB, given application-provided near-plane and far-plane values, may be a particular number (such as, for example, 1000 or 2000 epochs) or may correspond to a particular condition (such as, for example, the change in J between epochs falling below a predetermined threshold, or the value of the loss function J at a particular epoch).

In particular embodiments, the range or distance between application-provided near and far plane values may be different than the range or distance between adjusted near and far plane values. The amount of difference between adjusted near and far plane values may be variable, for example based on the range (i.e., apparent distance from the camera, from the viewer's perspective) at which quality is most desired. As an example, an application provided near-plane may have a value of, e.g., 0.3 meters and an application provided far-plane may have a value of, e.g., 1100 meters. Step 210 may include filtering the application-provided depth to a specified range at which the most accurate depth information (e.g., the lowest cost as determined by the mean-square-error cost function J) is desired. For example, if the range at which most accurate depth information is desired is 10 meters from the (virtual) camera and less, then in particular embodiments the adjusted near plane value may be 1.8305 and the adjusted far-plane value may be 11.541. Again, these adjusted plane values are determined by the desired range, the application-provided plane values and the depth values determined therefrom, and the results of a cost function, such as the cost function J, as described more fully herein. The depth information for the desired range may be filtered using, e.g., filteredDepth (application_provided_depth <toNonlinearSpace(Range)), where "toNonlinearSpace" is a function that converts a range that corresponds to distances to non-linear depth space. The filtered depth may then be used as the depth D as described with respect to equation no. 4, above.

The desired range for which depth information has the best quality (e.g., within 10 meters, in the example above) is adjustable, both in distances and in the value of the range. For example, a desired range may be 5 to 20 meters from the virtual camera. In particular embodiments, using adjusted near and far plane values may result in slightly decreased depth accuracy over a small part of the desired range and drastically improved depth accuracy over other portions of the range. For example, continuing the example above in which a near-plane value of 1.8305 is used, using adjusted plane values may ultimately result in final depth values (i.e., depth values 156) that are slightly less accurate from 0.3 to 0.8 meters and are significantly more accurate 1 to 10 meters from the camera. Other choices of ranges in which to best maintain accuracy can result in other tradeoffs, but accuracy in the desired range is, overall, greatly increased.

At step 215, depth encoder 200 encodes the depth information for transmission using the adjusted near-plane value and the adjusted far-plane value. For example, as explained below, step 215 may take as input non-linear depth values provided by the application and return non-linear adjusted depth values, using the adjusted near-plane and far-plane values as accessed or determined (or both) in step 210.

For example, step 215 may include converting application-provided non-linear depth values to linear depth values. For example, this conversion may be made according to the following function:

float convertDepthNonLinearToEyeSpaceLinear(float
 d, float nearA, float farA) {return 1.0f/(((1.0f–
 farA/nearA)/farA)*d+((farA/nearA)/farA)); (7)

Where "1.0f" signifies a float number, "d" represents the non-linear depth values determined using the application-provided near-plane and far-plane values, and "nearA" and "farA" represent the application-provided near-plane value and far-plane value, respectively. This function returns linearized depth values from the non-linear application-provided depth values. While the function above represents an example of linearization, this disclosure contemplates other approaches, for example using variables of type "double" rather than of type "float."

Step 215 may include converting the linear depth values, determined using the application-provided depth values based on the application-provided near and far plane values, to adjusted linear depth values. The adjusted linear depth values are based on the adjusted near-plane value and the first near-plane value and may be a function of those values, for example according to the following function:

float depthLinearB=depthLinearA−NearA+NearB; (8)

where "depthLinearB" represents the adjusted linear depth values and "depthLinearA" represents the linear, application-provided depth values.

Step 215 may include converting the adjusted linear depth values to adjusted non-linear depth values, for example according to the following function:

float convertDepthEyeSpaceLinearToNonLinear(float
 d, float near, float far) {return(d*far−far*near)/
 (d*far−d*near)}; (9)

where "d" represents the adjusted linear depth values, "far" represents the adjusted far-plane value, and "near" represents the adjusted near-plane value.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2. Moreover, this disclosure contemplates that some or all of the computing operations described herein, including certain steps of the example method illustrated in FIG. 2, may be performed by circuitry of a computing device described herein, by a processor coupled to non-transitory computer readable storage media, or any suitable combination thereof.

After depth values are encoded, for example by using the example depth encoder 200 of FIG. 2, the encoded three-dimensional content, which include the encoded depth values and the RGB values, may then be passed to video encoder 108. Video encoder 108 may then encode the RGB data and the depth data, e.g., according to the H.264 or H.265 format, to another device, such as device 150. Device 150 may include a video decoder 152, which decodes the received data, including RGB data and the encoded depth data, according to the format in which the data was encoded by video encoder 108.

Once decoded, decoded RGB data 158 may be ready to use, e.g., to reconstruct the 3D content for display on a display of device 150. For the depth data, after decoding by video decoder 152, the depth data may then be passed to depth decoder 154 on device 150. Depth decoder 154 may take the adjusted non-linear depth data that was encoded using the adjusted near-plane and far-plane values and ultimately output non-linear depth data encoded with the application provided near-plane and far-plane values. For example, depth decoder 154 may first convert the adjusted non-linear depth values to adjusted linear depth values, for example using equation no. 7 above, but with "d" representing the adjusted non-linear depth values, "far" representing the adjusted far-plane value, and "near" representing the adjusted near-plane value. Depth decoder 154 may then covert the adjusted linear depth values to non-adjusted linear depth values, for example according to float depthLinearA=depthLinearB+NearA−NearB, where the variables represent the terms described above in connection with equation 8. Depth decoder 154 may then convert the linear depths encoded with the application-provided near and far plane values to non-linear depths encoded with those values, for example by using equation no. 9, but with "d" representing the linear depths encoded with application-provided near and far plane values, "far" representing the application-provided far plane value, and "near" representing the application provided near-plane value. The end result is non-linearized depth values 156 encoded using application provided near-and-far plane values, which may then be used for, e.g., displaying images on device 150. Thus, as shown in the example of FIG. 1, depth values encoded by a graphics engine using application-provided near-and-far planes can be transmitted from a first device and displayed on a second device using standard video encoding, such as H.264/H.265, without sacrificing depth quality or depth accuracy because the depth values are encoded for transmission between devices using adjusted near-and-far plane values.

Figure 3:
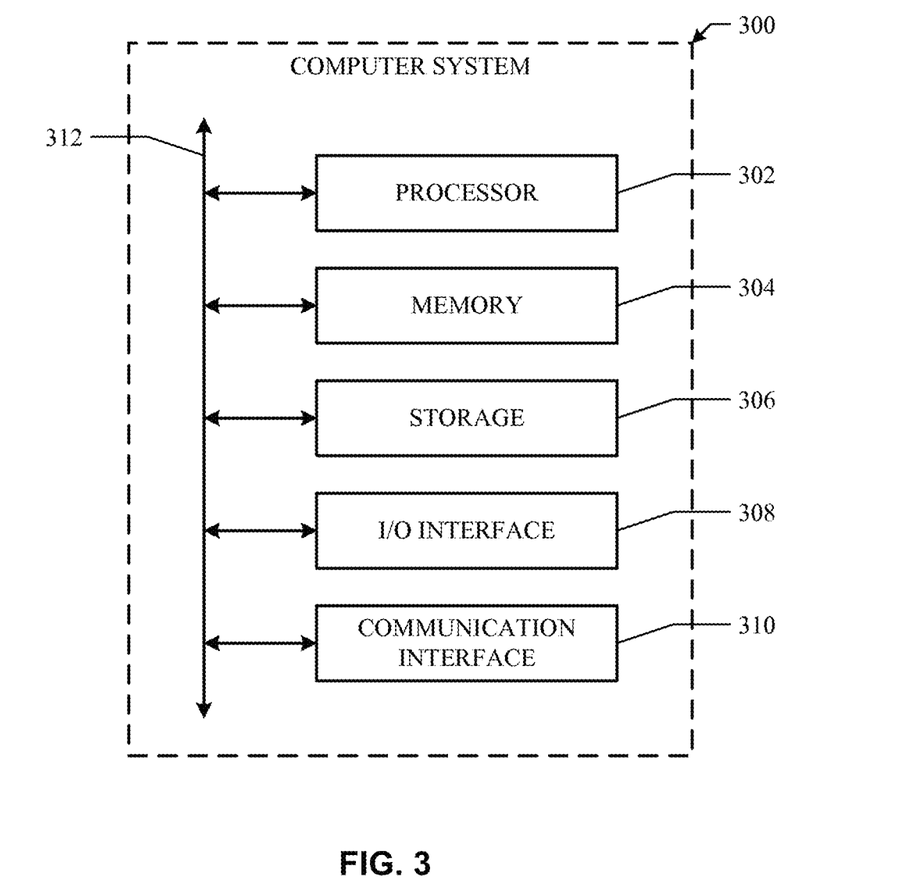
FIG. 3 illustrates an example computing device.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   accessing depth information for three-dimensional content for one or more images, the depth information having been encoded based on a first near-plane value and a first far-plane value, wherein the first near-plane value and the first far-plane value define display parameters for displaying the one or more images;
   accessing an adjusted near-plane value and an adjusted far-plane value, wherein the adjusted near-plane value and the adjusted far-plane value are based on a loss function with respect to minimizing a loss in the depth information for the three-dimensional content, wherein the adjusted near-plane value and the adjusted far-plane value define transmission parameters for transmitting the one or more images between a first device and a second device; and
   encoding the depth information for transmission using the adjusted near-plane value and the adjusted far-plane value.

2. The method of claim 1, further comprising:
   encoding, based at least in part on the encoded depth information, the three-dimensional content for transmission to another computing device; and
   transmitting the encoded three-dimensional content to the other computing device.

3. The method of claim 2, wherein encoding the three-dimensional content for transmission comprises encoding the three-dimensional content using H.264 or H.265 encoding.

4. The method of claim 3, wherein:
   the method is executed by a first computing device, wherein the first computing device includes an application generating the three-dimensional content; and
   the other computing device is configured to display the one or more images to a user.

5. The method of claim 4, wherein the other computing device comprises a wearable headset.

6. The method of claim 4, wherein the other computing device includes:
   a first decoder configured to decode the encoded three-dimensional content; and
   a second decoder configured to decode, based on the adjusted near-plane value and the adjusted far-plane value, the encoded depth information.

7. The method of claim 1, wherein encoding the depth information for transmission using the adjusted near-plane value and the adjusted far-plane value comprises:
   converting first non-linear depth values to first linear depth values, using the first near-plane value and the first far-plane value;
   adjusting the first linear depth values to adjusted linear depth values using the first near-plane value and the adjusted near-plane value; and
   converting the adjusted linear depth values to adjusted non-linear depth values, using the adjusted near-plane value and the adjusted far-plane value.

8. The method of claim 1, further comprising determining the adjusted near-plane value and the adjusted far-plane value according to a training model using gradient descent.

9. The method of claim 8, wherein the loss function comprises a mean-square difference between linearized depth values for the depth information and linearized, converted depth values, wherein the converted depth values comprise depth values encoded based on the adjusted near-plane value, the adjusted far-plane value, and a function that converts depth values to 8-bit unsigned integers.

10. The method of claim 9, wherein the linearized depth values are confined to a predetermined range corresponding to a distance from a virtual camera.

11. One or more non-transitory computer readable storage media embodying instructions for execution by one or more processors to:
   access depth information for three-dimensional content for one or more images, the depth information having been encoded based on a first near-plane value and a first far-plane value, wherein the first near-plane value and the first far-plane value define display parameters for displaying the one or more images;
   access an adjusted near-plane value and an adjusted far-plane value, wherein the adjusted near-plane value and the adjusted far-plane value are based on a loss function with respect to minimizing a loss in the depth information for the three-dimensional content, wherein the adjusted near-plane value and the adjusted far-plane value define transmission parameters for transmitting the one or more images between a first device and a second device; and
   encode the depth information for transmission using the adjusted near-plane value and the adjusted far-plane value.

12. The media of claim 11, wherein the processors are further operable to execute the instructions to:
   encode, based at least in part on the encoded depth information, the three-dimensional content for transmission to another computing device; and
   transmit the encoded three-dimensional content to the other computing device.

13. The media of claim 12, wherein encoding the three-dimensional content for transmission comprises encoding the three-dimensional content using H.264 or H.265 encoding.

14. The media of claim 13, wherein:
the media and processor are part of a first computing device, wherein the first computing device includes an application generating the three-dimensional content; and
the other computing device is configured to display the one or more images to a user.

15. The media of claim 14, wherein the other computing device comprises a wearable headset.

16. The media of claim 14, wherein the other computing device includes:
a first decoder configured to decode the encoded three-dimensional content; and
a second decoder configured to decode, based on the adjusted near-plane value and the adjusted far-plane value, the encoded depth information.

17. The media of claim 11, wherein processors that are operable to execute the instructions to encode the depth information for transmission using the adjusted near-plane value and the adjusted far-plane value comprise processors that are operable to execute the instructions to:
convert first non-linear depth values to first linear depth values, using the first near-plane value and the first far-plane value;
adjust the first linear depth values to adjusted linear depth values using the first near-plane value and the adjusted near-plane value; and
convert the adjusted linear depth values to adjusted non-linear depth values, using the adjusted near-plane value and the adjusted far-plane value.

18. The media of claim 11, wherein the processors are further operable to execute the instructions to determine the adjusted near-plane value and the adjusted far-plane value according to a training model using gradient descent.

19. A system comprising one or more processors and a non-transitory computer readable storage media embodying instructions coupled to the one or more processors, the one or more processors operable to execute the instructions to:
access depth information for three-dimensional content for one or more images, the depth information having been encoded based on a first near-plane value and a first far-plane value, wherein the first near-plane value and the first far-plane value define display parameters for displaying the one or more images;
access an adjusted near-plane value and an adjusted far-plane value, wherein the adjusted near-plane value and the adjusted far-plane value are based on a loss function with respect to minimizing a loss in the depth information for the three-dimensional content, wherein the adjusted near-plane value and the adjusted far-plane value define transmission parameters for transmitting the one or more images between a first device and a second device; and
encode the depth information for transmission using the adjusted near-plane value and the adjusted far-plane value.

20. The system of claim 19, wherein the processors are further operable to execute the instructions to:
encode, based at least in part on the encoded depth information, the three-dimensional content for transmission to another computing device; and
transmit the encoded three-dimensional content to the other computing device.

* * * * *